Jan. 27. 1925.
A. WOOD
EQUALIZING STEADY REST AND DRIVER FOR AXLE LATHES
Filed May 10, 1922    3 Sheets-Sheet 1
1,524,329
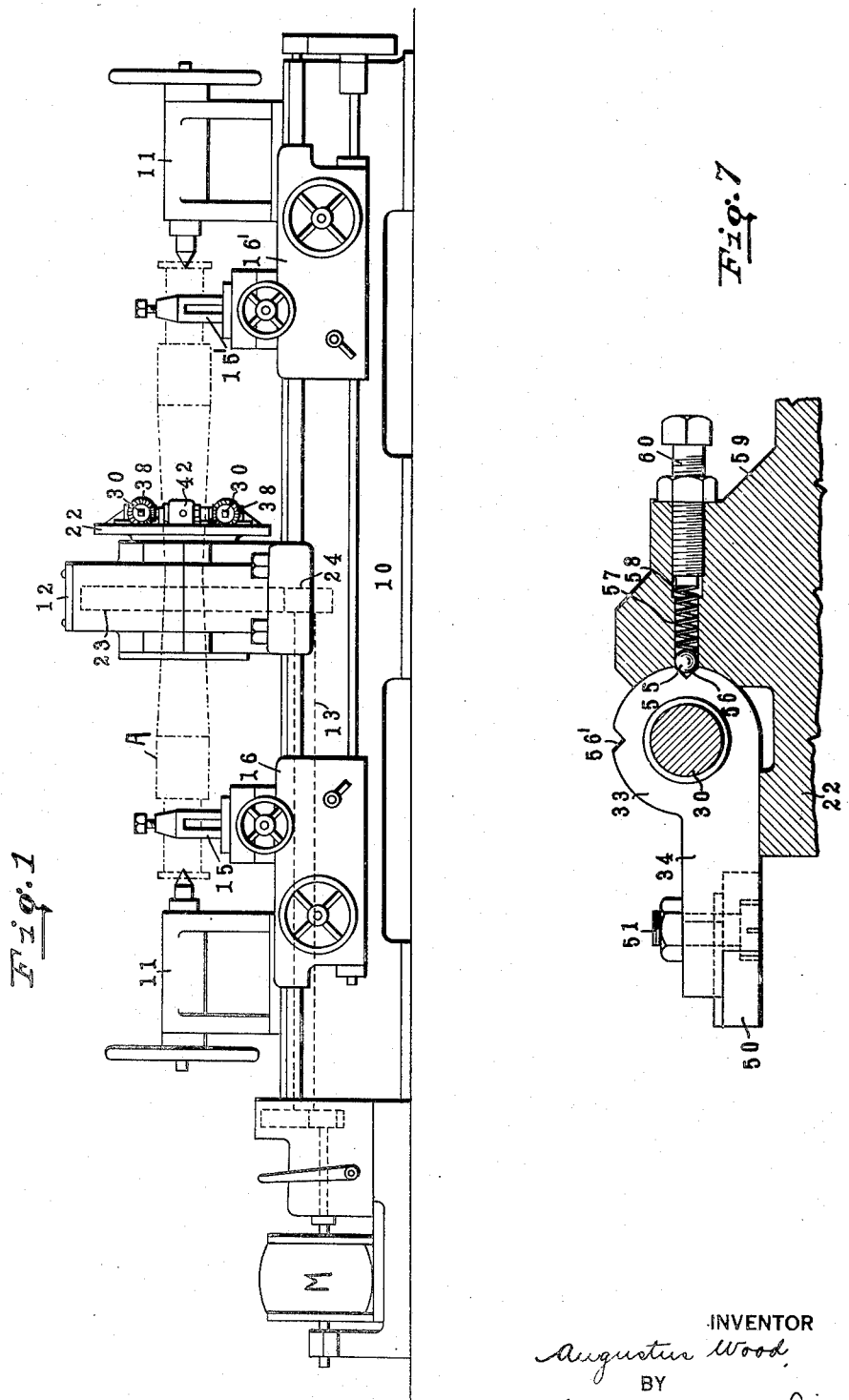
INVENTOR
Augustus Wood,
BY
Duell, Warfield & Duell.
ATTORNEY

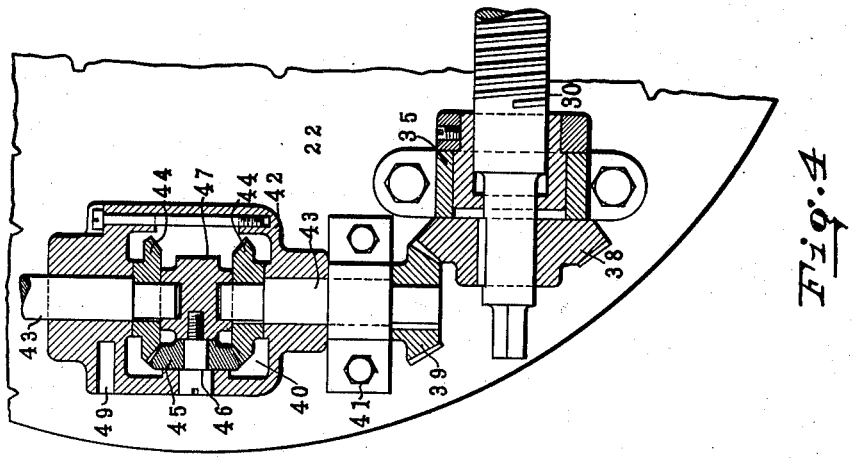

Jan. 27, 1925.　　　　　　　　　　　　　　　　　1,524,329
A. WOOD
EQUALIZING STEADY REST AND DRIVER FOR AXLE LATHES
Filed May 10, 1922　　　3 Sheets-Sheet 3
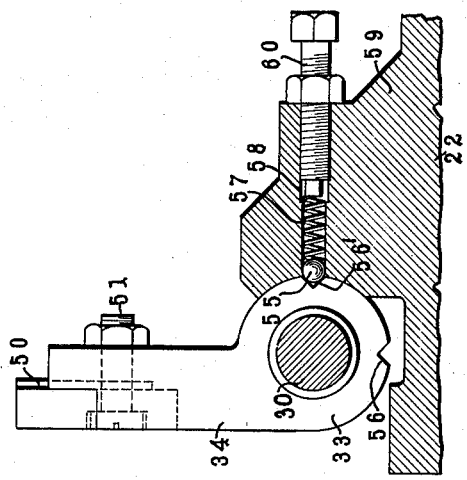
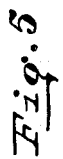
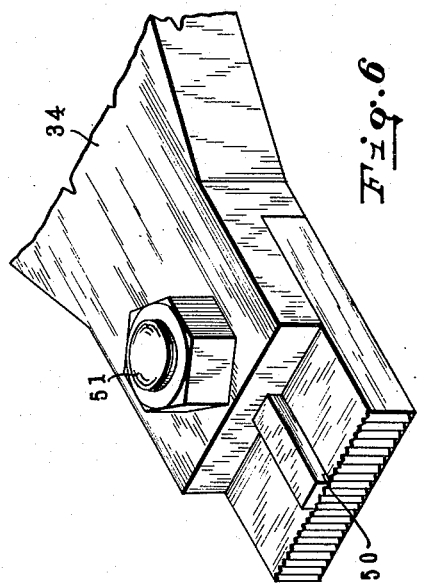
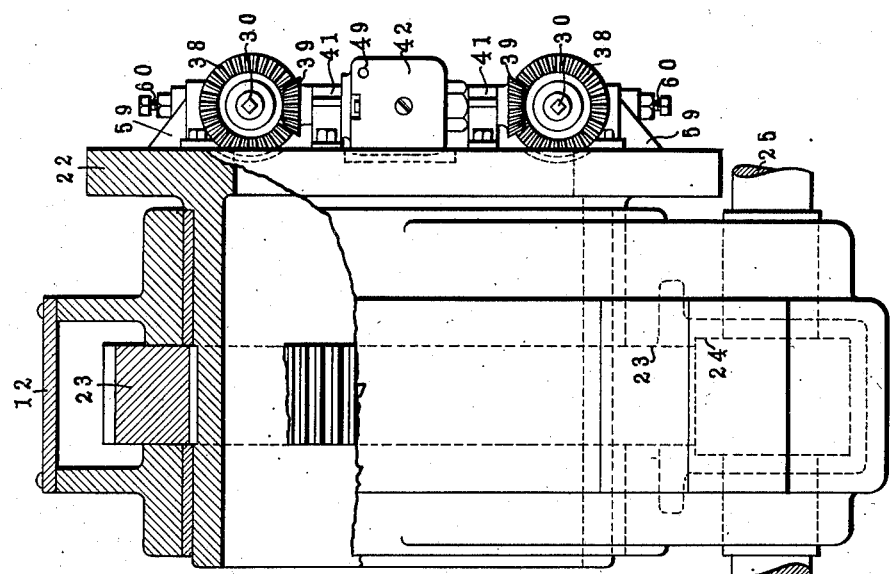
INVENTOR
Augustus Wood,
BY
Duell, Warfield & Duell
ATTORNEY Patented Jan. 27, 1925.

1,524,329

UNITED STATES PATENT OFFICE.

AUGUSTUS WOOD, OF FITCHBURG, MASSACHUSETTS, ASSIGNOR TO MANNING, MAXWELL & MOORE, INC., OF NEW YORK, N. Y., A CORPORATION OF NEW JERSEY.

EQUALIZING STEADY REST AND DRIVER FOR AXLE LATHES.

Application filed May 10, 1922. Serial No. 559,695.

*To all whom it may concern:*

Be it known that I, AUGUSTUS WOOD, a citizen of the United States, residing at Fitchburg, in the county of Worcester and State of Massachusetts, have invented certain new and useful Improvements in Equalizing Steady Rests and Drivers for Axle Lathes, of which the following is a full, clear, and exact description, such as will enable others skilled in the art to which it appertains to make and use the same.

This invention relates to machine tools and more particularly to the lathe type of machine tools.

This invention has for its object an improved construction and arrangement of parts which is durable, efficient and readily manufactured.

A more specific object of this invention is to provide the driving head in lathe type machine tools with an improved device which permits the article being machined to be held in a predetermined axial alignment and compensates for any eccentricity or surface irregularities in the article.

Another object is to provide lathes which drive from the center with an improved device which is adapted to transmit driving force to the gripping mechanism which grips the article at the center and retains it steadily in a predetermined axial alignment regardless of surface irregularities on the portion where gripped.

Still another object is to provide a device of this character with a mechanically equalized and compensated gripping mechanism in order to permit such mechanism automatically to accommodate itself to such eccentricity or irregularities of the article, such as a car axle, where gripped.

Other objects and advantages will in part be specifically pointed out hereinafter and in part obvious from the arrangements and constructions here set forth.

The invention accordingly consists in the features of construction, combinations of elements and arrangement of parts which will be exemplified in the construction hereinafter set forth, and the scope of their application will appear in the appended claims.

For a more complete understanding of the nature and advantages of this invention reference should be had to the following detailed description, which describes the best illustrative embodiments of this invention at present known to me, taken in connection with the accompanying drawing in which:

Fig. 1 shows a lathe type of machine tool constructed for turning car axles in accordance with this invention;

Fig. 2 shows an end elevation of the driving head of the machine shown in Fig. 1 equipped with means for mechanically compensating for surface eccentricities in the article where gripped, in accordance with this invention;

Fig. 3 is a side elevation, part being broken away, of the driving head shown in Fig. 2; and Figs. 4, 5, 6 and 7 show details of the gripping mechanism on the driving head.

Referring now to the drawing, and to Fig. 1 in particular, 10 denotes the bed having tail-stocks 11 on each end, which are adapted to slide on ways suitably formed on the bed 10. Disposed between the tail-stocks 11, in substantially centered position, is the driving head 12 which is driven from any convenient source of power, for example an electric motor M as shown in the drawing, which transmits driving power to the head through suitable gearing and shafting, indicated in dotted lines in Fig. 1 at 13.

The tail-stocks 11 are adapted to be drawn up and secured in place to support in predetermined axial alignment the article to be machined, which in the instance shown is a car axle indicated in broken lines at A in Fig. 1.

Machine operations are accomplished upon the car axle A by means of a tool or other instrumentality secured in the tool supporting means 15 and 15' carried respectively by the carriages 16 and 16', which slide upon the ways on the bed 10.

The driving head as shown in Figs. 2 and 3 comprises a casing 12 adapted to rest on and be secured to the ways of bed 10. Journaled in this head 12 is the plate 22 which is driven by the large gear 23 keyed thereon and meshing with a spur gear 24 on the shaft 25, which is a part of the shafting 13. The plate 22 is adapted to support the means including the gripping mechanism which is mechanically arranged to compensate for surface eccentricities in the car axle A where gripped.

The compensating means as here shown comprises a pair of parallel shafts 30 each provided with two threaded portions indicated at 31 and 32 respectively, which portions have their threads formed in opposite directions, i. e. one is a right-handed thread, the other a left-handed thread. Engaging with each threaded portion of the shafts 30 is a sleeve 33 of a dog-member or gripper 34, which together constitute the gripping mechanism for gripping the car axle A. Each sleeve 33 is threaded to engage with one of the portions 31 and 32.

The parallel shafts 30 turn in bearings 35 and 36 disposed at each end thereof which, as shown, are secured to the plate 22. As seen in Fig. 2, the left hand ends of the parallel shafts 30 are also indicated projecting beyond the bearing 35. Shafts 30 have relatively long bearing surfaces at both ends, and are adapted to slide longitudinally as well as to rotate in bearings 35 and 36. Beveled gears 38 are loosely keyed or otherwise mounted on shafts 30 to impart rotational movement thereto, and in turn mesh with beveled pinions 39 on the differential shafting 40, which shafting turns in bearings 41 that are also secured on the plate 22. This differential shafting comprises a housing 42 which has a pair of oppositely extending shafts 43 journaled therein. Within the housing 42, the shafts 43 have secured thereto the beveled pinions 44 which engage with the idling pinion 45, turning on the stud 46 projecting from the wall of the housing 42. In order that the gear within the housing 42 may be rigidly held in place, a distance piece 47 is provided in which the ends of the shafts 43 turn; it also accommodates the end of the stud 46 as shown. The housing 42 is conveniently provided with one or more external sockets 49, in order to accommodate a wrench or other tool for rotating it.

The dog-members 34 as shown in Fig. 5 comprise plates which are integral with the threaded sleeves 33 that engage with the threaded portions of parallel shafts 30. The plate of a dog-member 34, as shown in Fig. 7, is designed to fit snugly against the surface of the plate 22, which revolves.

The plates of the dog-members 34, as indicated, are preferably designed so as to have a medial plane that passes between the axis of the screw 30 and the surface of the plate 22. To the outer ends of the plates of the dog-members 34 are detachably secured the serrated engaging or gripping members 50, the latter as clearly shown in Fig. 6 are secured thereto by means of the bolts 51. The gripping members 50 are located in a plane between the face of the plate 22 and the axes of the shafts 30 on which the dogs are pivoted. By the arrangement shown, it will be seen that when the dog-members cause the serrated edges of the members 50 to engage with the car axle A, the reactive thrust through the dog-members produces moments or torques tending to urge the plates of the dog-members into closer contact with the surface of the plate 22. This arrangement therefore serves as a mechanical expedient for preventing the gripping mechanism from working away from the axle when gripped. Additional means, however, are preferably provided for preventing these dog-members from tending to turn or work away from the surface of the plate 22. This additional means is clearly illustrated in Figs. 5 and 7, and comprises a ball 55, urged yieldingly into a co-operating pit 56 formed in the outer surface of the threaded sleeve 33. This yielding force on the ball 55 is provided by means of the helical spring 57, arranged to bear thereon, and held in place in a bore 58 of the block 59 by means of the thread screw or plunger 60 which engages with corresponding thread formed in the bore 58; there being a block 59 secured adjacent each parallel shaft 30 on the plate 22.

The sleeves 33 are also preferably provided with another set of pits adapted to receive a ball 55, as indicated at 56' in order that the dog-members 34 shall have two predetermined positions in which they are more or less securely held; one when in engagement with the surface of the plate 22, as illustrated in Fig. 7, the other when retracted for purposes of better admitting the article to the opening in the plate 22. The retracted position is shown in Fig. 5.

In operation, a car axle to be machined is put in place between the tail-stocks 11 with the assistance of an auxiliary crane (not shown in the drawing); the dog-members 34, constituting the gripping mechanism, are then advanced to engage with the car axle by manipulating the differential shafting 40 by a wrench applied at 49. The differential shafting 40 normally operates as a unit to transmit equal but opposite rotative movements to the parallel shafts 30. The rotative movements of the shafts 30 in the threaded sleeves 33 cause the four dog-members 34 to move simultaneously inward to grip the car axle A. At the same time shafts 30 adjust themselves longitudinally by sliding in their bearings 35 and 36 so that all dog-members 34 grip the axle uniformly. Should there be any local surface eccentricity on the car axle A where gripped which would cause the dog-members 34 on one side to engage with it before those on the other side engage, the differential action of the differential shafting is then called into play; i. e. when there is resistance to the movement of one shaft 30 so that as the housing 42 is revolved by the application of the wrench, one shaft 43 fails to respond, then its gear 44 constituting an abutment against which the gear 45 reacts to transmit a rotation to the other gear 44 at twice the usual rate. As a consequence the unresisted turning of the other shaft 30 is accelerated, and its dog-members 34, as a result, are quickly drawn into gripping engagement with the car axle A holding it in a predetermined axial alignment, though eccentrically, and transmitting driving force thereto when rotated by the head. The local eccentricity of its surface where gripped is thus compensated for. When the axle has been thus gripped the shafts may, if desired, be clamped rigidly against rotation or endwise movement by any means suitable for the purpose such as a set screw, or the bearing 36 may be made contractible to perform the additional function of a clamp.

It is noted that by the above described arrangement for clamping the dogs 34 onto the axle A, all of the dogs bite evenly and simultaneously into the axle and consequently produce substantially no bending or flexure in the work. Furthermore, the lathe is not subjected to unnecessary stresses and its useful life is therefore prolonged.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In a machine tool, the combination with a driving head, of gripping dogs for gripping the article to be machined, and means driven by said head for transmitting driving forces to said gripping mechanism, and mechanism separate from said dogs adapted mechanically to compensate for surface eccentricities in the article where gripped.

2. In a machine tool, the combination with a driving head, of gripping mechanism for gripping the opposite sides of the article to be machined, and means including a geared differential mechanism connecting the opposite gripping means for transmitting driving forces positively to said gripping mechanism and moving them into and out of gripping engagement.

3. In a machine tool, the combination with a driving head, of gripping mechanism for gripping the article to be machined, and means comprising shafts for moving said gripping mechanism into and out of engagement with the article, and a connection including a differential mechanism adapted to rotate said shafts normally at equal rates, but at unequal rates when resistance is encountered by a portion of said gripping mechanism.

4. In a machine tool, the combination with a driving head, of a rotatable plate journaled in said head and driven thereby, means on said plate provided with gripping dogs arranged to engage with the article to be machined, and rotary means connected with said dogs adapted to compensate automatically for surface eccentricities in the article where gripped.

5. In a machine tool, the combination with a driving head, of a rotatable plate journaled in said head and driven thereby, and means on said plate comprising gripping members adapted to engage with the article to be machined, shafting geared to said members and arranged to cause them to converge simultaneously, and a differential mechanism mechanically connecting portions of said shafting and arranged to permit said portions to move at different rates when resistance is encountered by reason of surface eccentricities in said article.

6. In a machine tool, the combination with a driving head, of a rotatable plate journaled in said head and driven thereby, and means on said plate comprising four quadrantly disposed gripping members, gearing for moving said members inwardly simultaneously to grip the article to be machined, and a mechanical device arranged to permit movement of said members at different rates when resistance is encountered by said members by reason of surface eccentricities in the article gripped.

7. In a machine tool, the combination with a driving head, of a rotatable plate journaled in said head and driven thereby, and means on said plate comprising four quadrantly disposed gripping members, gearing for moving said members inwardly simultaneously to grip the article to be machined, and a differential mechanism coupled with the gearing for moving the members and arranged to permit movement thereof at different rates when resistance is encountered by them upon engaging said article.

8. In a machine tool, the combination with a driving head, of a rotatable plate journaled in said head and driven thereby, and means on said plate comprising four quadrantly disposed gripping members, a pair of shafts having threaded portions each adapted to move a pair of said members, and a mechanical device connected to move said shafts simultaneously and at equal rates normally and at unequal rates when resistance is encountered by the set of members moved by either shaft.

9. In a machine tool, the combination with a driving head, of a rotatable plate journaled in said head and driven thereby, and means on said plate comprising four quadrantly disposed gripping members, a pair of shafts having threaded portions each adapted to move a pair of said members, and a differential mechanism geared to each shaft and arranged when normally rotated to drive said shafts simultaneously and at equal rates but permitting said shafts to be driven at unequal rates when resistance is encountered by the set of members on either shaft.

10. In a machine tool, the combination with a driving head, of a rotatable plate journaled in said head and driven thereby, and means on said plate comprising four quadrantly disposed gripping members each having a threaded sleeve, a pair of parallel shafts having two separate threaded portions each adapted to engage with one sleeve, said threaded portions being formed to produce simultaneous inward or outward movement of its set of members when the shaft is rotated, and a differential mechanism jointly geared to each shaft and arranged to drive them normally at equal rates but at unequal rates when resistance is encountered by either set of members.

11. A compensating device for the driving heads of lathe type machine tools comprising a support, two pairs of gripping members thereon each pair being mechanically coupled to move simultaneously into engagement with the article to be machined, and a separate compensating means mechanically permitting movement at unequal rates of both pairs of gripping members when a member encounters resistance.

12. A compensating device for the driving heads of lathe type machine tools comprising a support, quadrantly arranged gripping members disposed thereon, a pair of shafts arranged to move said members simultaneously in converging or diverging directions, and a differential mechanism connecting said shafts whereby they are rotated normally at equal rates to center and grip an article to be machined but permits of unequal movement of said shafts when resistance is encountered by the set of members driven by a shaft by reason of eccentricities in the surface of the article where gripped.

13. A compensating device for the driving heads of lathe type machine tools comprising a support, quadrantly arranged gripping members disposed thereon, each provided with a threaded sleeve, a pair of parallel shafts rotatively mounted on said support each having two oppositely threaded portions each of which engages with one of said sleeves, said shafts at one of their adjacent ends being provided with beveled gears, and a differential mechanism having gears meshing with said beveled gears and arranged normally to drive said shafts at equal rates to enable them to move said members into simultaneous engagement with the article to be machined but at unequal rates when the set of members moved by either shaft encounters resistance by reason of local eccentricities in the surface of the article where gripped.

14. A lathe including, in combination, a support, a plurality of sets of gripping members disposed about an article to be machined, each said set comprising a pair of such gripping members movable toward and away from each other and also movable in the same direction, and means to apply force equally and simultaneously to said gripping members to grip said article.

15. A lathe including, in combination, a support, a plurality of sets of gripping members disposed about an article to be machined, each said set comprising a pair of such gripping members movable toward and away from each other and also movable in the same direction, and means to apply force equally and simultaneously to said gripping members to grip said article, said means including a differential power transmitting mechanism associated with said sets.

16. In a machine tool, the combination with a driving head, of a rotatable plate journaled in said head and driven thereby, and means on said plate comprising four quadrantly disposed gripping members, a pair of longitudinally movable shafts having threaded portions each adapted to move a pair of said members, and a mechanical device connected to move said shafts simultaneously.

17. In a machine tool, the combination with a driving head, of a rotatable plate journaled in said head and driven thereby, and means on said plate comprising four quadrantly disposed gripping members, a pair of longitudinally movable shafts having threaded portions each adapted to move a pair of said members, and a mechanical device connected to move said shafts simultaneously, and at equal rates normally and at unequal rates, when resistance is encountered by the set of members moved by either shaft.

18. A compensating device for the driving heads of lathe type machine tools comprising, in combination, a support, quadrantly arranged gripping members, disposed thereon, each provided with a threaded sleeve, a pair of parallel shafts rotatable and longitudinally movable on said support each having two oppositely threaded portions each of which engages with one of said sleeves, said shafts at one of their adjacent ends being provided with beveled gears, and a differential mechanism having gears meshing with said beveled gears and arranged normally to drive said shafts at equal rates to enable them to move said members into simultaneous engagement with the article to be machined but at unequal rates when the set of members moved by either shaft encounters resistance by reason of local eccentricities in the surface of the article where gripped.

19. A compensating device for machine tools adapted to grip the article to be machined, comprising two pairs of movable members arranged to engage with the article, means for moving the members of each pair toward each other to grip the article, and mechanical connections including a differential mechanism adapted to operate said means and move said engaging members but at different rates when resistance is encountered.

20. In a machine tool, the combination with means for supporting and centering the work at both ends, of an intermediate driving head comprising a rotary plate through which the work passes, dog members for gripping the work, said dog members being mounted on the plate to swing toward and from the face of the plate on axes parallel with the face of the plate, and means for holding the dog members against the face of the plate comprising gripping members on the ends of the dog members having serrated gripping surfaces located in planes between the face of the plate and the axes on which the dog members are mounted to swing.

21. In a machine tool, the combination of a driving head comprising a rotary plate, dog members for gripping the work, said dog members being mounted on the plate to swing independently toward and from the face of the plate on axes parallel with the face of the plate, and means for holding the dog members against the face of the plate.

22. In a machine tool, the combination of a driving head comprising a rotary plate, dog members for gripping the work, said dog members being mounted on the plate to swing toward and from the face of the plate on axes parallel with the face of the plate, and means for holding the dog members against the face of the plate, comprising gripping members located in position to force the dog members back against the plate, with additional yielding means for holding the dog members in the same position or in a transverse open position.

In testimony whereof I affix my signature, in the presence of two witnesses.

AUGUSTUS WOOD.

Witnesses:
MARMADUKE M. WILLS,
ERNEST L. FICKETT.